(12) United States Patent
Tehrani et al.

(10) Patent No.: US 7,731,419 B2
(45) Date of Patent: Jun. 8, 2010

(54) DEVICE, KIT AND METHOD FOR MONITORING A PARAMETER HISTORY

(75) Inventors: Payman Tehrani, Norrköping (SE); Nathaniel D. Robinson, Linköping (SE); David Nilsson, Mantorp (SE); Magnus Berggren, Vreta Kloster (SE); Petronella Norberg, Linköping (SE)

(73) Assignee: Acreo AB, Kista (SE)

( * ) Notice: Subject to any disclaimer, the term of this patent is extended or adjusted under 35 U.S.C. 154(b) by 134 days.

(21) Appl. No.: 11/806,104

(22) Filed: May 30, 2007

(65) Prior Publication Data

US 2008/0013595 A1 Jan. 17, 2008

(30) Foreign Application Priority Data

May 30, 2006 (EP) .................................. 06114698

(51) Int. Cl.
*G01K 3/00* (2006.01)
(52) U.S. Cl. ........................ 374/102; 374/103
(58) Field of Classification Search ................ 374/102, 374/162, 103; 335/208
See application file for complete search history.

(56) References Cited

U.S. PATENT DOCUMENTS

| | | | | |
|---|---|---|---|---|
| 3,638,495 A | * | 2/1972 | Sessler | ........................ 374/103 |
| 4,277,974 A | * | 7/1981 | Karr et al. | .................... 374/102 |
| 4,607,962 A | * | 8/1986 | Nagao et al. | ................. 374/103 |
| 4,746,223 A | * | 5/1988 | Miyata et al. | ................ 374/103 |
| 4,804,275 A | * | 2/1989 | Kang et al. | ................... 374/162 |
| 4,929,090 A | | 5/1990 | Grahm | |
| 6,198,701 B1 | | 3/2001 | De Jonghe et al. | |
| 2006/0152313 A1 | * | 7/2006 | Zmood | ........................ 335/208 |

FOREIGN PATENT DOCUMENTS

| | | |
|---|---|---|
| EP | 0735368 | 10/1996 |
| GB | 903967 | 8/1962 |
| GB | 2180964 | 4/1987 |

OTHER PUBLICATIONS

European Search Report (dated Sep. 13, 2007).
European Search Report.

* cited by examiner

*Primary Examiner*—Andre J Allen
(74) *Attorney, Agent, or Firm*—Harness, Dickey & Pierce, P.L.C.

(57) ABSTRACT

A device for determining a parameter history indication of at least one external parameter includes, in at least one embodiment, a first electrode portion, in consuming contact with a first electrolyte, and a second electrode portion, in consuming contact with a second electrolyte. A consumption process of the second electrode portion, in at least one embodiment, is controllable by an amount of consumption of said first electrode portion. The electrolytes are so arranged that consumption rates of the first electrode portion and the second electrode portion present different dependencies on the at least one external parameter. A kit of parts including such a device, and a method for determining a parameter history indication of at least one external parameter are also disclosed.

48 Claims, 4 Drawing Sheets

DEVICE, KIT AND METHOD FOR MONITORING A PARAMETER HISTORY

PRIORITY STATEMENT

The present application hereby claims priority under 35 U.S.C. §119 on European patent application number EP 06114698.1 filed May 30, 2006, the entire contents of which is hereby incorporated herein by reference.

TECHNICAL FIELD

The present disclosure relates to a device and method for monitoring a parameter history.

The subject matter of the disclosure is particularly suitable for monitoring temperature history of e.g. temperature-sensitive goods, such as groceries.

BACKGROUND

It is generally desirable to know whether a temperature-sensitive good, at any point in time, has been subjected to an undesirable temperature, and thus may have been damaged.

It would also be desirable to know at what point in time the good was subjected to such undesirable temperature, such that measures may be taken to prevent such undesirable temperatures in the future, or such that responsibility may be allocated.

It would also be desirable to know for how long time the good was subjected to such undesirable temperature.

With such additional knowledge, it would be possible to determine, with greater accuracy, whether the good has actually been damaged or not.

A frequently occurring type of goods that would be desirable to monitor, is groceries, in particular groceries that are to be kept cold or frozen. However, as many groceries are produced in large volumes and are subject to cost restraints, a suitable monitoring device would need to be capable of being produced at a low cost.

U.S. Pat. No. 4,929,090 A discloses a device that is to be attached to objects, such as groceries, for recording what temperatures the object has been subjected to. The device comprises multiple electrode sets interacting with an electrolyte. Temperature sensors are arranged to complete an electrical circuit including two electrodes at a predetermined temperature. The device disclosed in U.S. Pat. No. 4,929,090 A is, however, relatively complex, and it is unlikely that this device can be produced at a sufficiently low cost.

U.S. Pat. No. 6,198,701 B1 discloses an electrochemical timer for use with groceries, involving electrodes and an electrolyte. Consumption of one of the electrodes enables measuring the time. The device of U.S. Pat. No. 6,198,701 B1 does not provide any knowledge of what temperatures the good has been subjected to.

U.S. Pat. No. 4,804,275 A discloses an indicator device for indicating the time integral of a monitored parameter. However, the device of U.S. Pat. No. 4,804,275 A does not provide any information as to when the monitored object was subjected to a particular temperature, or for how long.

GB 903,967 A discloses an indicator for temperature history of a frozen grocery, wherein the electrolytic action is temperature-dependent, with substantially no electrolytic action taking place below a predetermined temperature level. Hence, the device of GB 903,967 A is only capable of indicating the time integral of the temperature for the period when the predetermined temperature was superseded. Hence, the device of GB 903,967 A also does not provide any indication of when the monitored object was subjected to a particular temperature.

EP 0 735 368 A1 discloses a method for monitoring an accumulated value of temperature and time. The method involves contacting an oxidation-polymerizable dyestuff and an oxidation agent, the reaction between which being controlled by time and temperature. Hence, the method of EP 0 735 368 A1 also does not provide any indication of when the monitored object was subjected to a particular temperature.

Hence, there is a need for an improved device for monitoring a parameter history.

SUMMARY

It is a general object of the present disclosure to provide a device and a method, which overcome or alleviate the disadvantages of prior art devices.

It is a particular object to provide a device and a method, which enable temperature monitoring at a low cost.

The objects are wholly or partially achieved by a device, a kit and a method as set forth in the appended independent claims. Embodiments are set forth in the dependent claims and in the following description and drawings.

According to a first aspect, there is provided a device for determining a parameter history indication of at least one external parameter. The device comprises a first electrode portion, which is in consuming contact with a first electrolyte, and a second electrode portion, which is in consuming contact with a second electrolyte. A consumption process of the second electrode portion, is controllable by an amount of consumption of said first electrode portion. The electrolytes are so arranged that consumption rates of the first electrode portion and the second electrode portion present different dependencies on the at least one external parameter. By "consuming contact" is meant that the contact should be sufficient for the electrode to be effectively consumed, e.g. reduced, oxidized, or even over-oxidized.

By "consumption rate" is meant the rate by which the electrode is consumed or degraded so as to a sufficient extent loose its conductivity.

Such a device can be implemented with per se known electrochemical components, and may be produced by minor changes to an existing printing process. One electrolyte can be made to monitor time, the other to monitor the parameter.

The extent of consumption of a first electrode can be used to control, e.g. to switch off, a consumption process of another electrode, termed "third electrode". Respective consumption rates are controlled by selecting suitable electrolytes, the ion conductivity of which govern the respective consumption speed, and being dependent on one or more external parameters, such as temperature, humidity or the presence of certain substances.

The effect set forth can be obtained, as elaborated upon below, by selecting electrolytes having different properties, by selecting electrode materials having different properties or by arranging the electrodes and/or electrolytes in a certain way.

At least one of the first and third electrodes may be electrochemically degradable. In one embodiment, at least one of the first and third electrodes may be irreversibly degradable.

The second electrolyte may be in contact with a branch of the first electrode.

In a first group of embodiments the first electrode portion is formed by an electrode, termed "first electrode", and the second electrode portion is formed by another electrode, termed "third electrode".

The second electrolyte may be in contact with a branch of the first electrode.

The device may further comprise another electrode, termed "second electrode", which is spaced from the first electrode, wherein the third electrode is spaced from the first electrode, and wherein the second electrolyte is connected, by a connecting point, to the first electrode and in contact with the third electrode.

The term "connecting point" implies that a connecting area between the second electrolyte and the second electrode has a limited extent.

The first electrode may have a first consumption portion extending between a first portion of the first electrode, close to the second electrode, and a second portion of the first electrode, at a distance from the second electrode.

The first consumption portion may be in contact with the first electrolyte.

The second and third electrodes may be spaced from each other.

The second and third electrodes may be connected to different potentials.

A consumption portion of the third electrode may be defined as an area of overlap between the third electrode and the second electrolyte. Hence, the third electrode does not need to present branches.

The third electrode may have a second consumption portion extending between a first portion of the third electrode, close to the first electrode, or to a branch of the first electrode, and a second portion of the third electrode, at a distance from the first electrode.

The second consumption portion may be in contact with the second electrolyte.

The third electrode may have at least two branches forming separate second consumption portions. By forming the consumption portions as branches, it is possible to detect the amount of consumption electronically.

In another group of embodiments, the second electrode portion may be a branch of a first electrode.

The second electrode portion may comprise a plurality of branches of the first electrode, each forming a respective consumption portion.

The second electrolyte may be in contact with both of said second consumption portions.

The branches may present differently sized consumption contact areas with said electrolyte.

The at least two consumption portions may have different lengths.

The at least two separate second consumption portions may be in contact with a respective second electrolyte.

The ion conductivities of the respective second electrolytes may present mutually different dependencies on the at least one external parameter.

The second electrolyte may be in contact with a second electrode.

The first electrolyte may be in contact with the second electrode.

The first and second electrolytes may have ion conductivities that present mutually different dependencies on the at least one external parameter.

The first electrolyte may be less sensitive to the at least one external parameter than the second electrolyte.

The first electrolyte may be effectively insensitive to the at least one external parameter.

"Effectively insensitive" means no major change in ion conductivity within the parameter interval wherein the device is to be used. For example, the melting point may be situated outside a temperature interval which is to be monitored. Hence, time indicator on first electrode, temperature indicator on third electrode.

The first electrolyte may be more sensitive to the at least one external parameter than the second electrolyte.

The second electrolyte may be effectively insensitive to the at least one external parameter. Hence, a temperature indicator may be provided on a first electrode, and a time indicator on a third electrode.

At least one of the first and second electrode portions may comprise a conducting polymer.

The at least one external parameter may be selected from a group consisting of temperature, humidity, gas concentration and liquid concentration.

The first and second electrolytes may have ion conductivities that present substantially the same dependency on the at least one external parameter. Hence, the electrolytes may be identical.

At least one of the first and second electrolytes may be open to interaction with said at least one external parameter, and the other one of said electrolytes may be at least partially, preferably entirely, isolated from said at least one external parameter. Hence, the one electrolyte may be encapsulated, while the other one is not.

According to another aspect, there is provided a kit of parts for determining a parameter history indication of at least one external parameter. The kit comprises a device for providing a history indication of at least one external parameter as claimed in any one of the preceding claims, and a detection device, arranged to detect an extent of the redox reaction of at least one of said electrode portions.

The kit may further comprise a pre-processing device for preprocessing at least one of the electrode portions to enable or facilitate said detection.

Such pre-processing may comprise applying a voltage, e.g. a reverse voltage, over the electrodes; or applying a processing agent, such as a reducing or oxidizing agent.

The pre-processing device may also comprise a chemical agent and optionally means for applying it to the history indicating device. Such means may, e.g. include a spraying device, a roller or a brush applicator.

According to a third aspect, there is provided a method for determining a parameter history indication of at least one external parameter. The method comprises using an amount of consumption of a first electrode portion, which is in consuming contact with a first electrolyte, to control a consumption process of a second electrode portion, which is in consuming contact with a second electrolyte. The electrolytes are arranged to provide consumption rates of the first and second electrode portions that present different dependencies on the at least one external parameter.

The electrolytes may have ion conductivities that present mutually different dependencies on the at least one external parameter.

The first and second electrolytes may have ion conductivities that present substantially the same dependency on the at least one external parameter.

One of said electrolytes may be open to interaction with said at least one external parameter, and the other one of said electrolytes may be at least partially, preferably entirely, isolated from said at least one external parameter.

In one embodiment, the method comprises applying a first potential between a first electrode, forming the first electrode portion, and a second electrode, spaced from the first electrode, thereby causing a first redox reaction by means of a first electrolyte, which is in contact with the first and second electrodes, and applying a second potential between the first electrode and a third electrode, spaced from the first electrode, and forming the second electrode portion, thereby causing a second redox reaction by means of a second electrolyte, which is connected, by a connecting point to the first electrode and which is in contact with the third electrode.

The second electrolyte may be in consuming contact with a branch of the third electrode.

In another embodiment, the method comprises applying a first potential between a first electrode, forming the first electrode portion, and a second electrode, spaced from the first electrode, thereby causing a first redox reaction by means of a first electrolyte, which is in contact with the first and second electrodes, and causing a second redox reaction by means of a second electrolyte, which is in contact with at least one branch of the first or second electrode, said branch forming the second electrode portion, and which second electrolyte is connected to the other one of the first and second electrodes.

The second electrolyte may be in contact with at least two branches of said first or second electrode.

The method may further comprise detecting an extent of the redox reaction of at least one of said electrode portions.

The method may further comprise detecting the position of a degradation front.

The degradation front may be an over-oxidation front.

The method may further comprise comparing the detected extent of the redox reaction with at least one reference value.

The method may further comprise a step for pre-processing at least one of the electrodes prior to said detection step.

Devices such as the ones described herein may be produced using a relatively low cost printing technique, and may thus be formed directly onto a label that is to be adhered to a product or package. Alternatively, the device may be printed directly onto the product or package.

Embodiments will now be described in more detail, with reference to the appended drawings.

The devices and methods described herein may be used in any situation, where it is desirable to monitor a parameter history.

DESCRIPTION OF EMBODIMENTS

The description will initially be directed to the first embodiment, the design and function of which is described with reference to FIGS. 1 and 2a-2c. Thereafter, the description will focus on the second embodiment, the design and function of which is described with reference to FIG. 3. Finally, referring to FIG. 4, the description will focus on the design and function of a system or kit of parts comprising a device 1, 1' according to one of the embodiments.

Whereas the disclosure is directed to a device, which may be used to monitor one or more external parameters, the described embodiment will be directed to a device for monitoring temperature. It is recognized that through the choice of suitable electrolytes, the structures and methods described herein may be used for monitoring e.g. humidity or the presence of a substance, e.g. a gas or a liquid.

The present disclosure is based on the understanding that the speed of an electrochemical process can be controlled by using an electrolyte, whose ion conductivity has a particular temperature dependency. For example, an electrolyte which at low temperatures is in a solid phase, thus having a low ion conductivity, may melt at a particular temperature, whereby the ion conductivity is drastically increased. As the speed of the electrochemical processes are limited by the ion conductivity, such a phase transition will increase the ion conductivity.

Simultaneously, another electrolyte, having an effectively temperature-independent ion conductivity, may be used to provide a time indication. By combining such electrolytes, it is possible to record whether the temperature has been above or below the melting temperature, and at what point in time. Components having electrolytes with different melting temperatures may be used for providing a broader effective temperature interval.

Figure 1:
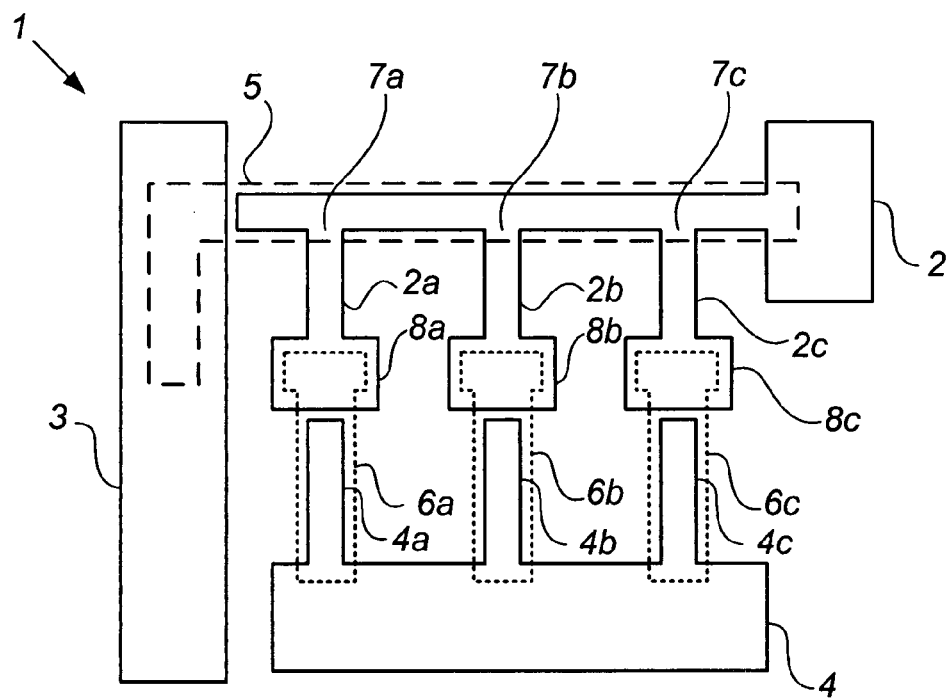
FIG. 1 schematically illustrates a device 1 according to a first embodiment.

Referring to FIG. 1, an indicator device 1 according to the first embodiment comprises a first electrode 2, 2a, 2b, 2c having a connecting pad (indicated at 2), a consumption portion, covered by an electrolyte 5, which for practical reasons will be referred to as the "first electrolyte". This first electrolyte 5 covers the consumption portion of the first electrode, as well as part of a second electrode 3.

The consumption portion of the first electrode 2 extends from a first end, which is spaced from, but which may be close to, another electrode 3, which is referred to as the "second electrode", and a second end, close to the connecting pad.

In the embodiment illustrated in FIG. 1, the consumption portion of the first electrode 2 is elongate, extending between the first end and the second end. Other shapes of the consumption portion are not excluded.

The first electrode 2 further comprises a plurality of "branches" 2a, 2b, 2c of the first electrode, providing connecting points 7a, 7b, 7c to the first electrode. The branches may be provided with connecting electrodes 8a, 8b, 8c for another electrolyte, which will be referred to as the "second electrolyte". In one embodiment, the first electrode 2, the branches 2a, 2b, 2c and the connecting electrodes 8a, 8b, 8c may be formed from the same material, such as a conducting polymer. Each of the branches of the first electrode meets with the consumption portion of the first electrode at a respective intersecting portion, which has a relatively small extension in the direction between the first and second ends of the consumption portion.

It is noted that the first electrode does not need to be entirely covered by the electrolyte. It is sufficient if the first electrolyte covers the connecting points 7a, 7b, 7c and a path, within the area of the first electrode 2, between the connecting points, such that a consumption portion may be formed. The first electrolyte should also contact the second electrode. Hence, the first consumption portion may be a relatively narrow consumption path.

The branches of the first electrode may be formed from the same material as the first electrode, or from any conducting material.

Another electrode 4, 4a, 4b, 4c, referred to as the "third electrode", is spaced from the first electrode, or, as illustrated in FIG. 1, spaced from the connecting electrode 8a, 8b, 8c.

A second electrolyte 6a, 6b, 6c may contact the respective connecting electrode 8a, 8b, 8c as well as a respective "branch" 4a, 4b, 4c of the third electrode 4. In the contact area between the respective branch 4a, 4b, 4c of the third electrode 4 and the second electrolyte 6a, 6b, 6c, the branches 4a, 4b, 4c of the third electrode 4 form a respective consumption portion of the third electrode 4, hereinafter referred to as "second consumption portion". The branches 4a, 4b, 4c of the third electrode need only be partially covered by the second electrolyte, such that path is formed to provide the consumption portion. Hence, the second consumption portion may be a relatively narrow consumption path.

In a first version, the first electrolyte 5 may be an electrolyte, whose ion conductivity is substantially stable throughout the temperature interval, wherein the device is to be used. Thereby, the consumption of the consumption portion of the first electrode 2 will be substantially constant, regardless of the ambient temperature. Hence, the consumption portion of the first electrode 2 will effectively provide a time indicator.

The second electrolyte 6a, 6b, 6c may be one or more electrolytes, whose ion conductivities present different temperature dependencies, both as compared with the first electrolyte 5 and, optionally, as compared with each other. That is, in one embodiment, the second electrolytes 6a, 6b, 6c are the same, whereas in another embodiment, the electrolytes are different.

Hence, the respective consumption portion of the branches 4a, 4b, 4c of the third electrode will effectively indicate a time integral of the temperature to which it has been subjected.

As one example, using PEDOT-PSS as electrode material, polyethylene glycol having different molecular weights can be used for the electrolytes. For example, a relatively low molecular weight may be selected for the first electrolyte 5, such that the electrolyte will be active and conducting throughout the temperature interval, wherein the device is to be used. Furthermore, successively higher molecular weights may be used for the each one of the portions of the second electrolyte 6a, 6b, 6c. Alternatively, all portions of the second electrolyte 6a, 6b, 6c may use the same electrolyte.

In a second version, the first electrolyte may be temperature sensitive, thereby providing the temperature indicator, whereas the second electrolyte may be relatively temperature insensitive, thereby providing a time indicator.

Figure 2A:
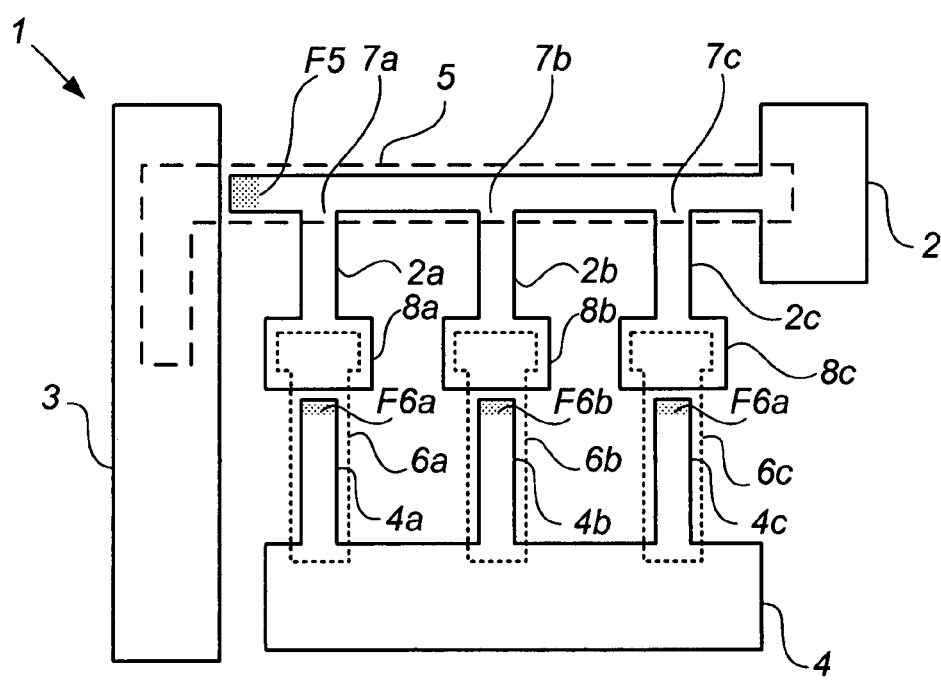
FIGS. 2a-2c illustrates the operation of the first embodiment of the device 1 of FIG. 1 at different points in time.
Figure 2B:
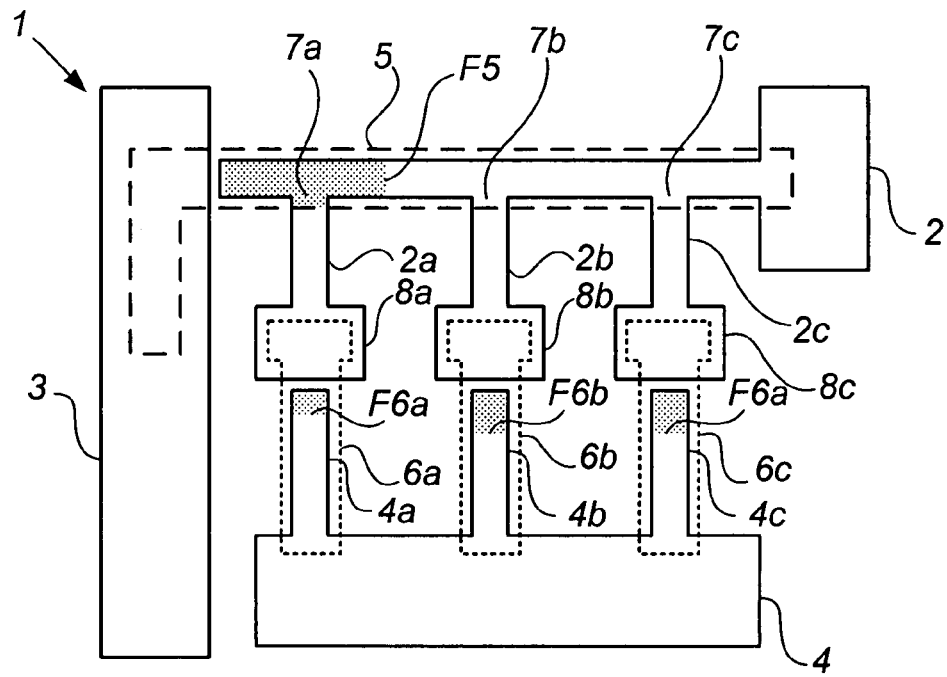
Figure 2C:
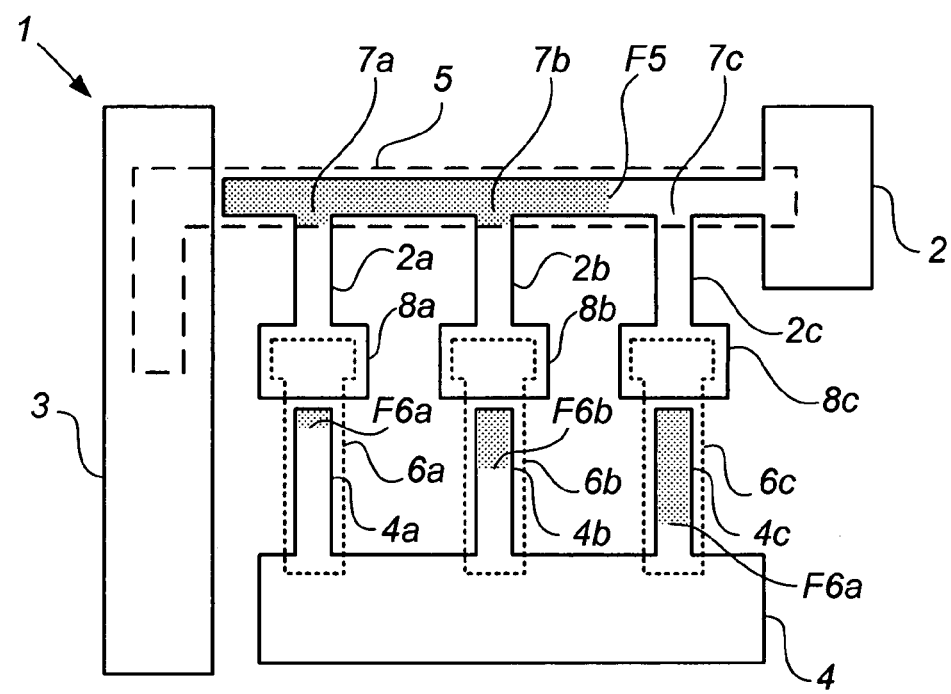

Referring to FIGS. 2a-2c, the function of the first variant of the first embodiment will now be described. FIGS. 2a-2c illustrate the In FIGS. 2a-2c, the shaded area illustrates the consumed, in this case over-oxidized, portion of the respective electrode. As is known, an over-oxidized PEDOT-PSS electrode does not conduct any current, and so, all current will need to travel past the consumed portion of the electrode through the electrolyte, in the form of ions. Furthermore, an over-oxidized PEDOT-PSS electrode is irreversible, and hence the device will retain the information encoded therein.

A zero potential is applied to the first electrode 2, a negative potential is applied to the second electrode 3 and a positive potential is applied to the third electrode 4.

FIG. 2a illustrates the state shortly after the potentials have been applied. As can be seen, portions of each consumption portion of the first electrode 2 and of the branches 4a, 4b, 4c of the third electrode 4, respectively, have been consumed.

Turning to FIG. 2b, a sufficient portion of the consumption portion of the first electrode has now been consumed, such that the connection to the first branch 2a of the first electrode 2 has been broken. Hence, the redox reaction occurring in the corresponding first branch 4a of the third electrode has ceased.

Based on knowledge of the first and third electrodes' properties, an average temperature can now be derived for a first time interval.

Turning to FIG. 2c, a sufficient portion of the consumption portion of the first electrode has now been consumed, such that the connection to the second branch 2b of the first electrode 2 has been broken. Hence, the redox reaction occurring in the corresponding second branch 4b of the third electrode has ceased.

Based on knowledge of the first and third electrodes' properties, an average temperature can now be derived for a second time interval.

By providing a sufficient number of branches 2a, 2b, 2c, 4a, 4b, 4c, and selecting suitable electrolytes, it is possible to provide a monitoring device covering desired temperature and time ranges.

When using an electrolyte, such as polyethylene glycol, it may be advantageous to cover or encapsulate the electrolyte portions, since such an electrolyte may be sensitive to humidity, and the ion conductivity thereof may be affected by absorption of water from the air.

Figure 3:
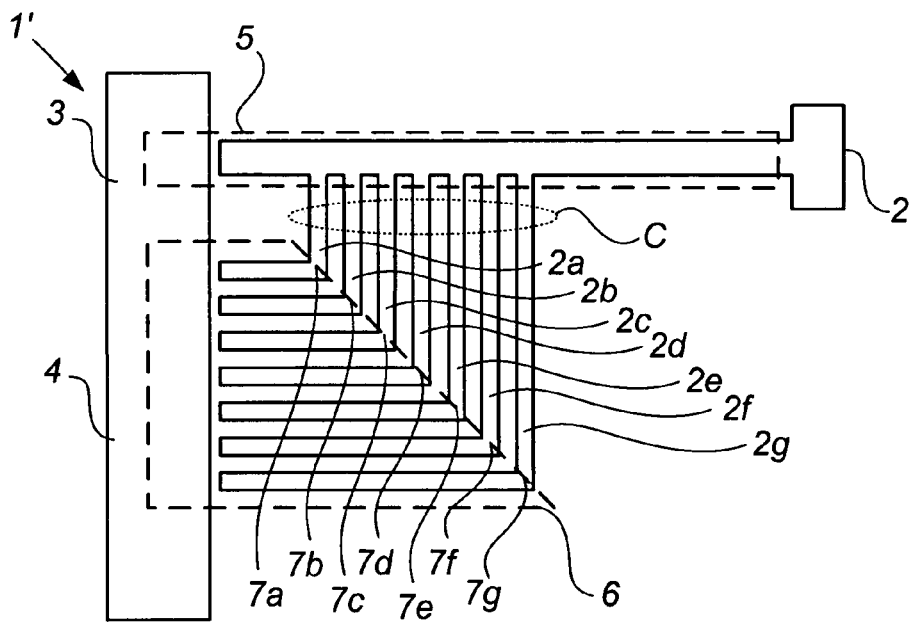
FIG. 3 schematically illustrates a device 1' according to a second embodiment.

Referring to FIG. 3, a second embodiment of an indicator device 1' will now be described.

In this second embodiment, the first electrode 2 extends between a connecting pad thereof and the second electrode 3, and presents seven branches 2a, 2b, 2c, 2d, 2e, 2f, 2g, arranged analogously with the branches 2a, 2b, 2c of the first embodiment. Also analogously with the embodiment of FIG. 1, the first electrode has a consumption portion, covered by an electrolyte 5, which is termed "first electrolyte".

However, in the second embodiment, the branches 2a, 2b, 2c, 2d, 2e, 2f, 2g are of different length. Furthermore, the branches 2a, 2b, 2c, 2d, 2e, 2f, 2g are covered by the electrolyte 6, termed "second electrolyte" to a mutually different extent.

In the illustrated embodiment, each of the branches 2a, 2b, 2c, 2d, 2e, 2f, 2g comprises two sections, which extend in different directions, as illustrated in FIG. 3. Such an arrangement is not necessary, but may be advantageous with a view to saving space, since only those portions of the branches 2a, 2b, 2c, 2d, 2e, 2f, 2g that are actually used need to be produced. Similar arrangements may be provided also in the first embodiment. Other geometric shapes of the branches 2a, 2b, 2c, 2d, 2e, 2f, 2g are not excluded.

Finally, the branch end portions that are farthest away from the consumption portion of the first electrode 2, are arranged close to, but spaced from the third electrode 4. The second electrolyte thus contacts the branches 2a, 2b, 2c, 2d, 2e, 2f, 2g of the first electrode 2 and the third electrode. However, the third electrode 4 may be integrated with the second electrode, as illustrated in FIG. 3, to such an extent that a single electrode is formed.

Hence, as compared with the first embodiment, it may be said that the second and third electrodes are electrically interconnected, such that only a single potential is needed. This facilitates power supply to the device 1'.

The second embodiment also provides a further advantage, in that the portions of the branches 2a, 2b, 2c, 2d, 2e, 2f, 2g that are not covered by the second electrolyte 6, need not be protected from the surrounding atmosphere, since they can be formed such that they are not subject to degradation by e.g. humidity etc. For example, the non-electrolyte covered branches may be formed from a material that is not sensitive to humidity, temperature, gases or liquids. Such a portion C can be used for connecting a detection device 21 for collecting data from the indicator device 1', and/or a pre-processing device 22, 22' for applying a voltage to the electrode at issue.

The second embodiment operates as follows: The first electrode 2 provides a time indicator, while the parts of the branches 2a, 2b, 2c, 2d, 2e, 2f, 2g covered by the second electrolyte 6 form the temperature indicators.

The second embodiment will then operate in a manner similar to the first version of the first embodiment.

In an alternative version of the second embodiment, separate electrolyte portions may be provided for each of the branches 2a, 2b, 2c, 2d, 2e, 2f, 2g, each such separate electrolyte portion being in contact only with the branch associated therewith, and with the electrode 4.

The devices described with reference to FIGS. 1-3 may be produced by a per se known printing process. Such a process may involve four steps: patterning (e.g. printing) of conducting polymer, printing of temperature sensitive electrolyte(s), printing of temperature independent electrolyte and encapsulation.

The potential or potentials that are needed for the device to operate may e.g. be provided by using a timer switch, such as is described in EP-05103647.3, which was filed on 2 May 2005 and assigned to the present applicant.

Other prior art voltage sources can also be used.

Figure 4:
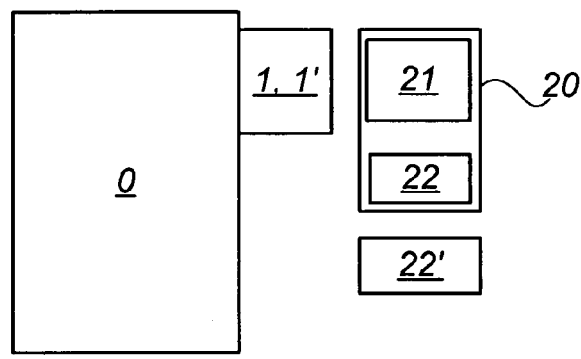
FIG. 4 is a schematic block diagram illustrating a system or kit comprising a device 1, 1' according to one of the embodiments.

FIG. 4 schematically illustrates a system or kit of parts, wherein the indicator devices 1, 1' described above may form part. As illustrated, the indicator device 1, 1' may be attached to or formed on a product or a package 0. A detection device 20 for interaction with the indicator device 1, 1' may comprise a detector 21, having e.g. an image sensor, or a contacting electrode; and optionally a pre-processing device 22. The pre-processing device may be a voltage source, a source of a chemical agent, a radiation source, a light source etc., as elaborated upon below.

According to another alternative, the pre-processing is provided by an external pre-processing device 22', which may be as the ones mentioned above or elaborated upon below.

In any of the above illustrated embodiments or versions, at least one of the electrodes may be formed from an irreversibly degrading material. Examples of such materials may be conducting polymers, which may be degraded by over-oxidation; and metals, which may be dissolved through the redox reaction. Known conducting polymers include PEDOT-PSS, polypyrroles, polyanilines polythiophenes, and derivatives thereof.

A further, presently merely theoretical, approach would be if an stable over-reducible (n-doped) conducting polymer could be provided.

The electrolytes used preferably present a conductivity, which is lower than the electron conductivity of the electrodes. In any case, the electrolytes must be selected, adapted or tuned to each other and to the electrodes.

Electrolytes, such as the ones mentioned herein may present an S-shaped temperature-conductivity curve, having a first lower curve portion of relatively linear temperature-conductivity ratio, a second upper portion of relatively linear temperature-conductivity ratio, and a transition portion there between.

The electrolyte may be based on e.g. polyethylene glycol and a salt, such as $LiF_3CSO_3$ or any other salt. When using such electrolytes, the temperature-insensitive electrolyte may be based on a high-molecular weight polyethylene glycol, and thus a high melting point. The other electrolytes may be based on lower-molecular weight polyethylene glycols, thus having lower melting points.

Polyethylene glycol can also be used for providing moisture sensitivity. Hence, the sensor needs to be encapsulated for providing only temperature sensitivity. The sensor may be open for providing moisture and temperature sensitivity.

Melting salts may also be used as electrolytes.

It is further recognized that the first and second electrolytes may be identical with respect to ion conductivity, provided that they are differently arranged. For example, a humidity, gas or liquid monitoring device may be provided by encapsulating one of the electrolytes, but not the other. Hence, the first electrolyte 5 may be encapsulated and thereby protected from interaction with the surrounding environment, to provide a time indicator. The second electrolyte 6, 6a, 6b, 6c may be open to the surrounding environment, and thus be affected by humidity, gas or liquid. In another version, the first electrolyte 5 may be non-encapsulated whereas the second electrolyte 6, 6a, 6b, 6c is encapsulated.

The description will now be directed to the issue of deriving results from the above indicator devices 1, 1'.

A first possibility may be to provide colored ions in or on the electrode portions interacting with the electrolytes. Thus, migration of the ions will tint the electrolyte to indicate the degradation front.

A per se known image sensor may be used to record the pattern provided by the thus colored devices 1, 1'.

Another possibility could be to provide a color changing indicator, which may be printed above or below the electrodes 2, 3, 4. Examples of such indicators may be "Neutral Red", "Safranine" and "Rose Bengal", all of which are known to the skilled person.

As an alternative, a reverse potential may be applied, whereby a reduction of the electrodes is provided, thus coloring the non-over-oxidized portions of the electrode. Such potential may be applied directly to the electrodes or through specific contact pads, which are arranged at those positions where it is desirable to provide such a reverse potential.

In the device 1' of FIG. 3, a voltage may be applied across two adjacent branches 2a, 2b, 2c, 2d, 2e, 2f, 2g, such that one of them is reduced up to the consumed portion. By successively contacting pairs of branches, the entire surface may, due to the bi-stability of the material, be reduced. Such reduction may be perceived as a change in color, which is recordable by an image sensor. Alternatively, every second or every third channel may be contacted and thus processed, if the information obtainable thereby is deemed sufficient.

Again, an image sensor may be used to record the pattern provided by the thus colored devices 1, 1'.

As yet another alternative, a reducing substance may be applied, e.g. sprayed or rolled, onto the indicator device 1, 1' to reduce the non-over-oxidized portions of the electrode, followed by recording by an image sensor.

Yet another alternative involves using a polymer which fades when over-oxidized, followed by recording by an image sensor. Examples of such polymers include polypyrroles, polyanilines polythiophenes, and derivatives thereof.

Based on data from the image sensor or measurements and knowledge of the characteristics of each electrolyte and electrode, the data from the indicator device 1, 1' can be interpreted and transformed into corresponding information that is understandable to the user.

Whereas PEDOT-PSS and polyethylene glycol have been mentioned as being suitable as electrode material and electrolyte, respectively, it is to be noted that the present disclosure is not intended to be limited to these materials.

Figure 5:
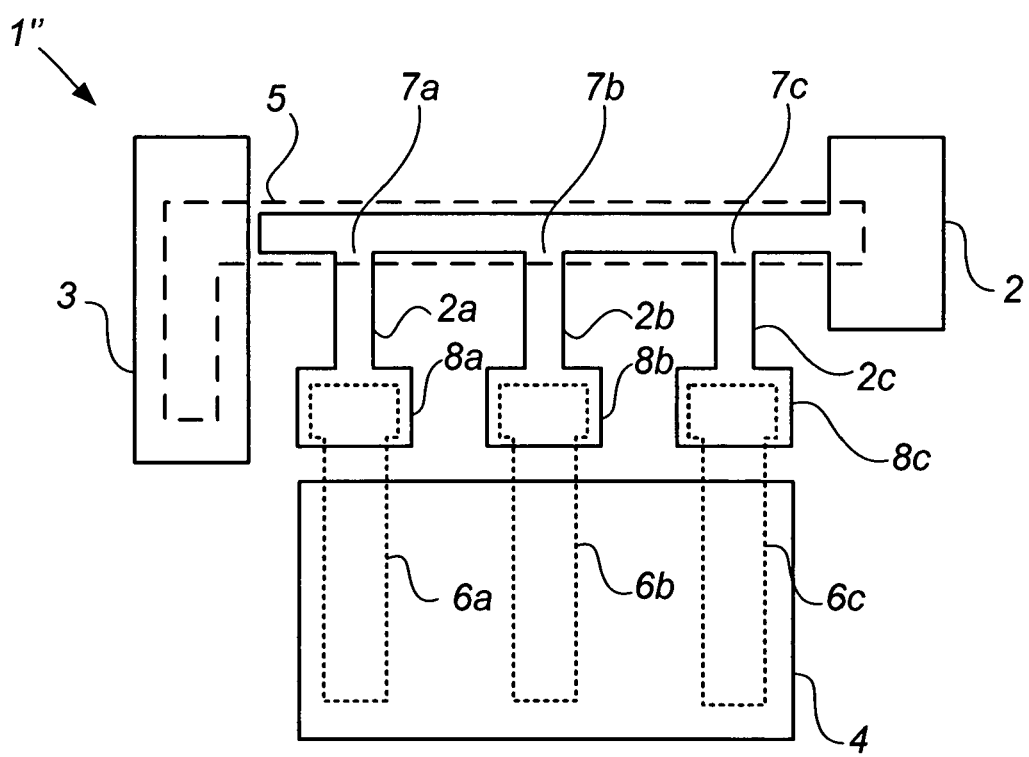
FIG. 5 is a schematically illustrates a simplified version of the first embodiment.

FIG. 5 schematically illustrates a simplified version of indicator device 1" of the embodiment of FIG. 1. The first and second electrodes 2, 3, the branches of the first electrode 2a, 2b, 2c, and the first electrolyte 5 are substantially the same as in version of FIG. 1.

However, the third electrode 4 does not need to present such branches 4a, 4b, 4c as are illustrated in FIG. 1. Instead, the second electrolyte is provided as a plurality of areas 6a, 6b, 6c, which, as illustrated, may have the form of strips, each of covering a respective consumption portion of the third electrode 4. When a potential is applied across the second electrolyte, the consumption portions of the third electrode 4 will be consumed, as described above. The amount of consumption of each consumption portion of the third electrode 4 can be determined visually, e.g. as a consequence of the electrode material changing color upon consumption. Such materials are known to the skilled person.

The invention claimed is:

1. A device for determining a parameter history indication of at least one external parameter, comprising:
    a first electrode portion, in consuming contact with a first electrolyte; and
    a second electrode portion, in consuming contact with a second electrolyte,
    wherein a consumption process of the second electrode portion is controllable by an amount of consumption of said first electrode portion;
    wherein, in use, the first electrode portion presents a different consumption than the second electrode portion and the first and second electrode portions present different dependencies on the at least one external parameter, and
    wherein at least one of the first and second electrode portions includes a conducting polymer.

2. The device as claimed in claim 1, wherein at least one of the first electrode portion and the second electrode portion is electrochemically degradable.

3. The device as claimed in claim 2, wherein at least one of the first electrode portion and the second electrode portion is irreversibly degradable.

4. The device as claimed in claim 1, wherein the first electrode portion is formed by an electrode, termed "first electrode", and the second electrode portion is formed by another electrode, termed "third electrode".

5. The device as claimed in claim 4, wherein the second electrolyte is in contact with a branch of the first electrode.

6. The device as claimed in claim 4, further comprising another electrode, termed "second electrode", spaced from the first electrode,
    wherein the third electrode is spaced from the first electrode, and
    wherein the second electrolyte is connected, by a connecting point, to the first electrode and in contact with the third electrode.

7. The device as claimed in claim 6, wherein the first electrode has a first consumption portion extending between a first portion of the first electrode, close to the second electrode, and a second portion of the first electrode, at a distance from the second electrode.

8. The device as claimed in claim 7, wherein the first consumption portion is in contact with the first electrolyte.

9. The device as claimed in claim 6, wherein the second and third electrodes are spaced from each other.

10. The device as claimed in claim 9, wherein the second and third electrodes are connected to different potentials.

11. The device as claimed in claim 4, wherein a consumption portion of the third electrode is defined as an area of overlap between the third electrode and the second electrolyte.

12. The device as claimed in claim 4, wherein the third electrode has a second consumption portion extending between a first portion of the third electrode, close to the first electrode, or to a branch of the first electrode, and a second portion of the third electrode, at a distance from the first electrode.

13. The device as claimed in claim 12, wherein the second consumption portion is in contact with the second electrolyte.

14. The device as claimed in claim 12, wherein the third electrode has at least two branches forming separate second consumption portions.

15. The device as claimed in claim 1, wherein the second electrode portion is a branch of a first electrode.

16. The device as claimed in claim 15, wherein the second electrode portion comprises a plurality of branches of the first electrode, each forming a respective consumption portion.

17. The device as claimed in claim 16, wherein the second electrolyte is in contact with both of said second consumption portions.

18. The device as claimed in claim 16, wherein said branches present differently sized consumption contact areas with said electrolyte.

19. The device as claimed in claim 16, wherein said at least two consumption portions have different lengths.

20. The device as claimed in claim 16, wherein said at least two separate second consumption portions are in contact with a respective second electrolyte.

21. The device as claimed in claim 20, wherein the ion conductivities of said respective second electrolytes present mutually different dependencies on the at least one external parameter.

22. The device as claimed in claim 15, wherein the second electrolyte is in contact with a second electrode.

23. The device as claimed in claim 15, wherein the first electrolyte is in contact with the second electrode.

24. The device as claimed in claim 1, wherein said first and second electrolytes have ion conductivities that present mutually different dependencies on the at least one external parameter.

25. The device as claimed in claim 24, wherein the first electrolyte is less sensitive to the at least one external parameter than the second electrolyte.

26. The device as claimed in claim 25, wherein the first electrolyte is effectively insensitive to the at least one external parameter.

27. The device as claimed in claim 24, wherein the first electrolyte is more sensitive to the at least one external parameter than the second electrolyte.

28. The device as claimed in claim 27, wherein the second electrolyte is effectively insensitive to the at least one external parameter.

29. The device as claimed in claim 1, wherein said at least one external parameter is selected from a group consisting of temperature, humidity, gas concentration and liquid concentration.

30. The device as claimed in claim 1, wherein the first and second electrolytes have ion conductivities that present substantially the same dependency on the at least one external parameter.

31. The device as claimed in claim 30, wherein one of said first and second electrolytes is open to interaction with said at least one external parameter, and the other one of said electrolytes is at least partially isolated from said at least one external parameter.

32. A kit of parts for determining a parameter history indication of at least one external parameter, comprising:
    a device for providing a history indication of at least one external parameter as claimed in claim 1; and
    a detection device, arranged to detect an extent of the redox reaction of at least one of said electrode portions.

33. The kit of parts as claimed in claim 32, further comprising a pre-processing device for pre-processing at least one of the electrode portions to enable or facilitate said detection.

34. The kit of parts as claimed in claim 33, wherein the pre-processing device comprises a voltage source.

35. The kit of parts as claimed in claim 33, wherein the pre-processing device comprises a chemical agent and means for applying it to the history indicating device.

36. A method for determining a parameter history indication of at least one external parameter, comprising:
using an amount of consumption of a first electrode portion, in consuming contact with a first electrolyte, to control a consumption process of a second electrode portion, in consuming contact with a second electrolyte, wherein, in use, the first electrode portion has a different consumption rate than the electrode portions and the first and second electrode portions present different dependencies on the at least one external parameter, and
wherein at least one of the first and second electrode portions includes a conducting polymer.

37. The method as claimed in claim 36, wherein the electrolytes have ion conductivities that present mutually different dependencies on the at least one external parameter.

38. The method device as claimed in claim 37, wherein the first and second electrolytes have ion conductivities that present substantially the same dependency on the at least one external parameter.

39. The method as claimed in claim 38, wherein one of said electrolytes is open to interaction with said at least one external parameter, and the other one of said electrolytes is at least partially, preferably entirely, isolated from said at least one external parameter.

40. The method as claimed in claim 36, comprising:
applying a first potential between a first electrode, forming the first electrode portion, and a second electrode, spaced from the first electrode, thereby causing a first redox reaction by way of a first electrolyte, in contact with the first and second electrodes, and
applying a second potential between the first electrode and a third electrode, spaced from the first electrode, and forming the second electrode portion, thereby causing a second redox reaction by way of a second electrolyte, connected, by a connecting point to the first electrode and in contact with the third electrode.

41. The method as claimed in claim 40, wherein the second electrolyte is in consuming contact with a branch of the third electrode.

42. The method as claimed in claim 36, comprising:
applying a first potential between a first electrode, forming the first electrode portion, and a second electrode, spaced from the first electrode, thereby causing a first redox reaction by way of a first electrolyte, in contact with the first and second electrodes, and
causing a second redox reaction by way of a second electrolyte, in contact with at least one branch of the first or second electrode, said branch forming the second electrode portion, the second electrolyte being connected to the other one of the first and second electrodes.

43. The method as claimed in claim 42, wherein the second electrolyte is in contact with at least two branches of said first or second electrode.

44. The method as claimed in claim 36, further comprising detecting an extent of the redox reaction of at least one of said electrode portions.

45. The method as claimed in claim 44, wherein detecting an extent of the redox reaction comprises detecting the position of a degradation front.

46. The method as claimed in claim 45, wherein the degradation front is an over-oxidation front.

47. The method as claimed in claim 44, further comprising comparing the detected extent of the redox reaction with at least one reference value.

48. The method as claimed in claim 44, further comprising a step for pre-processing at least one of the electrodes prior to said detection step.

* * * * *

UNITED STATES PATENT AND TRADEMARK OFFICE
CERTIFICATE OF CORRECTION

| | | |
|---|---|---|
| PATENT NO. | : 7,731,419 B2 | Page 1 of 1 |
| APPLICATION NO. | : 11/806104 | |
| DATED | : June 8, 2010 | |
| INVENTOR(S) | : Payman Tehrani et al. | |

It is certified that error appears in the above-identified patent and that said Letters Patent is hereby corrected as shown below:

In claim 1, column 11, line 18, should read "consumption rate than" instead of "consumption than."

In claim 36, column 13, line 11, should read "consumption rate than the second electrode portion and" instead of "consumption rate than the electrode portions and."

Signed and Sealed this

Second Day of November, 2010

David J. Kappos
*Director of the United States Patent and Trademark Office*